US012795483B2

(12) United States Patent
Zhang

(10) Patent No.: US 12,795,483 B2
(45) Date of Patent: Nov. 10, 2026

(54) SERVICE SERVER SWITCHING CONTROL METHOD AND APPARATUS, ELECTRONIC DEVICE, AND STORAGE MEDIUM

(71) Applicant: TENCENT TECHNOLOGY (SHENZHEN) COMPANY LIMITED, Shenzhen (CN)

(72) Inventor: Zhuoyun Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 560 days.

(21) Appl. No.: 17/989,440

(22) Filed: Nov. 17, 2022

(65) Prior Publication Data

US 2023/0079314 A1 Mar. 16, 2023

Related U.S. Application Data

(63) Continuation of application No. PCT/CN2022/072924, filed on Jan. 20, 2022.

(30) Foreign Application Priority Data

Feb. 20, 2021 (CN) ........................ 202110195093.8

(51) Int. Cl.
*H04W 36/08* (2009.01)
*H04W 36/32* (2009.01)

(52) U.S. Cl.
CPC ......... *H04W 36/08* (2013.01); *H04W 36/322* (2023.05)

(58) Field of Classification Search
None
See application file for complete search history.

(56) References Cited

U.S. PATENT DOCUMENTS 11,197,209 B2 12/2021 Guo et al.
2015/0172983 A1 6/2015 Randriamasy et al.
(Continued)

FOREIGN PATENT DOCUMENTS

CN 107820283 A 3/2018
CN 108934007 A 12/2018
(Continued)

OTHER PUBLICATIONS

China National Intellectual Property Administration (CNIPA) Office Action 1 for 202110195093.8 Oct. 26, 2021 18 Pages (including translation).
(Continued)

*Primary Examiner* — Iqbal Zaidi
*Assistant Examiner* — Andrew Shaji Kurian
(74) *Attorney, Agent, or Firm* — ANOVA LAW GROUP, PLLC

(57) ABSTRACT

A service server switching control method includes: receiving a notification message from a core network accessed by a user equipment, the notification message being used for indicating that a user plane path of the user equipment may be changed; rescheduling a service server for the user equipment in response to the notification message; transmitting an Internet Protocol (IP) address of the rescheduled service server to the user equipment, to trigger the user equipment to switch a currently accessed service server to the rescheduled service server according to the IP address; and transmitting a confirmation message to the core network, the confirmation message being used for triggering the core network to change the user plane path of the user equipment.

17 Claims, 9 Drawing Sheets

(56) References Cited

U.S. PATENT DOCUMENTS

| | | | | |
|---|---|---|---|---|
| 2019/0215903 | A1 | 7/2019 | Wu et al. | |
| 2020/0329008 | A1 | 10/2020 | Dao | |
| 2020/0329403 | A1* | 10/2020 | Yuan | H04W 36/0019 |
| 2021/0045027 | A1* | 2/2021 | Hong | H04W 36/08 |
| 2021/0073022 | A1* | 3/2021 | Li | G06F 9/45558 |
| 2021/0105685 | A1* | 4/2021 | Li | H04W 36/0011 |
| 2021/0250826 | A1* | 8/2021 | Wang | H04W 36/0079 |
| 2021/0250838 | A1* | 8/2021 | Lu | H04W 36/0016 |
| 2021/0337447 | A1* | 10/2021 | Yang | H04W 36/02 |
| 2022/0014981 | A1* | 1/2022 | Pedersen | H04W 36/0072 |
| 2022/0110157 | A1* | 4/2022 | Wu | H04W 74/0808 |
| 2022/0141718 | A1* | 5/2022 | Shekhar | H04W 36/12 370/331 |
| 2022/0264440 | A1 | 8/2022 | Iwai | |
| 2023/0247716 | A1* | 8/2023 | Hong | H04W 28/0226 |
| 2023/0292205 | A1* | 9/2023 | Ramachandra | H04W 24/02 |
| 2023/0336269 | A1* | 10/2023 | Yu | H04W 36/12 |
| 2024/0323787 | A1* | 9/2024 | Ma | H04W 36/0038 |

FOREIGN PATENT DOCUMENTS

| | | | | |
|---|---|---|---|---|
| CN | 109413619 A | | 3/2019 | |
| CN | 109640319 A | | 4/2019 | |
| CN | 109842639 A | | 6/2019 | |
| CN | 109981316 A | | 7/2019 | |
| CN | 110278584 A | | 9/2019 | |
| CN | 110650513 A | | 1/2020 | |
| CN | 109156040 B | * | 4/2020 | H04W 36/0011 |
| CN | 110995826 A | | 4/2020 | |
| CN | 111083750 A | | 4/2020 | |
| CN | 111491013 A | | 8/2020 | |
| CN | 111586114 A | | 8/2020 | |
| CN | 111629030 A | | 9/2020 | |
| CN | 111885649 A | | 11/2020 | |
| CN | 112969209 A | | 6/2021 | |
| WO | 2019127068 A1 | | 7/2019 | |
| WO | 2021016631 A2 | | 1/2021 | |
| WO | 2021019847 A1 | | 2/2021 | |

OTHER PUBLICATIONS

The World Intellectual Property Organization (WIPO) International Search Report for PCT/CN2022/072924 Apr. 20, 2022 6 Pages (including translation).

Tencent. "Solution for Key Issue 1"SA WG2 Meeting #136-AH S2-2000701, Jan. 13-17, 2020, SA WG2 Meeting #136-AH, Incheon, Korea.

Haimei Wang, "Discussion on 5G enhancement technology for edge computing", Mobile Communications, vol. 4, 2020.

Nokia, "Solution for KI 1: Providing the DNS authoritative server with IP addressing information about where the UE is located ", SA WG2 Meeting #136AH S2-2000240, Jan. 13-17, 2020.

* cited by examiner

SERVICE SERVER SWITCHING CONTROL METHOD AND APPARATUS, ELECTRONIC DEVICE, AND STORAGE MEDIUM

RELATED APPLICATION(S)

This application is a continuation application of PCT Patent Application PCT/CN2022/072924 filed on Jan. 20, 2022, which claims priority to Chinese Patent Application No. 202110195093.8, entitled "SERVICE SERVER SWITCHING CONTROL METHOD AND APPARATUS, ELECTRONIC DEVICE, AND STORAGE MEDIUM" and filed with the China National Intellectual Property Administration on Feb. 20, 2021, all of which are incorporated herein by reference in entirety.

FIELD OF THE TECHNOLOGY

The present disclosure relates to the field of computer and communication technologies, and in particular, to a service server switching control method and apparatus, an electronic device, and a computer-readable storage medium.

BACKGROUND

In a 5G (fifth generation mobile communication technology) network architecture, when a user equipment moves and a service server desires to be reselected, technical problems arise as to how to reselect the service server for the user equipment and how to support service continuity.

SUMMARY

To resolve the technical problems, embodiments of the present disclosure provide a service server switching control method and apparatus, an electronic device, and a computer-readable storage medium.

In one aspect, the present disclosure provides a service server switching control method performed by an electronic device, the method including: receiving a notification message from a core network accessed by a user equipment, the notification message being used for indicating that a user plane path of the user equipment is to be changed; rescheduling a service server for the user equipment in response to the notification message; transmitting an Internet Protocol (IP) address of the rescheduled service server to the user equipment, to trigger the user equipment to switch a currently accessed service server to the rescheduled service server according to the IP address; and transmitting a confirmation message to the core network, the confirmation message being used for triggering the core network to change the user plane path of the user equipment.

In another aspect, the present disclosure provides a service server switching control method performed by an electronic device, the method including: receiving an Internet Protocol (IP) address of a service server transmitted by a service scheduling server, the service server being a service server that is rescheduled for a user equipment after the service scheduling server receives a notification message from a core network accessed by the user equipment, and the notification message being used for indicating that a user plane path of the user equipment is to be changed; and forwarding the IP address to the user equipment, to trigger the user equipment to switch a currently accessed service server to the rescheduled service server according to the IP address.

In yet another aspect, the present disclosure provides a service server switching control method performed by an electronic device, the method including: initiating a notification message to a service scheduling server, the notification message being used for indicating that a user plane path of a user equipment is to be changed, to cause the service scheduling server to reschedule a service server for the user equipment in response to the notification message and transmit an Internet Protocol (IP) address of the rescheduled service server to the user equipment; receiving a confirmation message returned by the service scheduling server; and changing, in response to the confirmation message, the user plane path of the user equipment in a core network accessed by the user equipment.

In yet another aspect, the present disclosure provides a service server switching control apparatus, the apparatus including: a memory storing computer program instructions; and a processor coupled to the memory and configured to execute the computer program instructions and perform: receiving a notification message from a core network accessed by a user equipment, the notification message being used for indicating that a user plane path of the user equipment is to be changed; rescheduling a service server for the user equipment in response to the notification message; transmitting an Internet Protocol (IP) address of the rescheduled service server to the user equipment, to trigger the user equipment to switch a currently accessed service server to the rescheduled service server according to the IP address; and transmitting a confirmation message to the core network, the confirmation message being used for triggering the core network to change the user plane path of the user equipment.

In yet another aspect, the present disclosure provides a service server switching control apparatus, the apparatus including: receiving an Internet Protocol (IP) address of a service server transmitted by a service scheduling server, the service server being a service server that is rescheduled for a user equipment after the service scheduling server receives a notification message from a core network accessed by the user equipment, and the notification message being used for indicating that a user plane path of the user equipment is to be changed; and forwarding the IP address to the user equipment, to trigger the user equipment to switch a currently accessed service server to the rescheduled service server according to the IP address.

In yet another aspect, the present disclosure provides a service server switching control apparatus, the apparatus including: initiating a notification message to a service scheduling server, the notification message being used for indicating that a user plane path of a user equipment is to be changed, to cause the service scheduling server to reschedule a service server for the user equipment in response to the notification message and transmit an Internet Protocol (IP) address of the rescheduled service server to the user equipment; receiving a confirmation message returned by the service scheduling server; and changing, in response to the confirmation message, the user plane path of the user equipment in a core network accessed by the user equipment.

In yet another aspect, the present disclosure provides a computer-readable storage medium is provided, storing computer-readable instructions, the computer-readable instructions, when executed by a processor of a computer, causing the computer to perform the service server switching control method provided in the various optional embodiments.

It is to be understood that the above general descriptions and the following detailed descriptions are merely for exemplary and explanatory purposes, and cannot limit the present disclosure.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
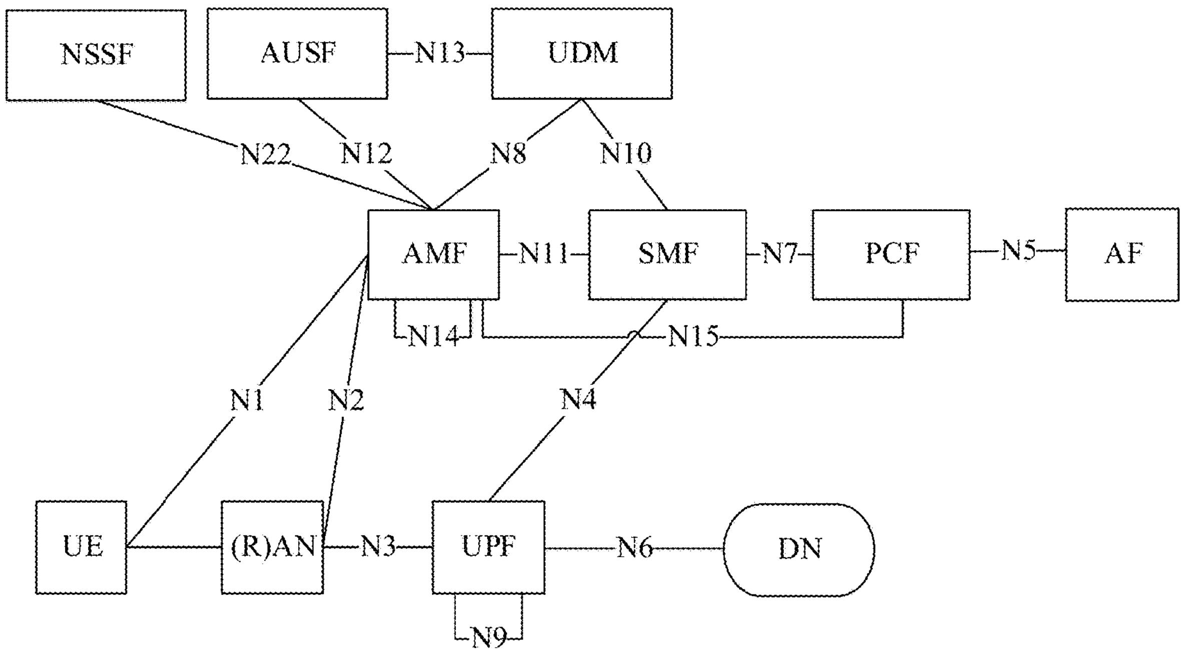
FIG. 1 is a schematic diagram of a network architecture according to certain embodiment(s) of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

Exemplary embodiments are described in detail herein, and examples of the exemplary embodiments are shown in the accompanying drawings. When the following descriptions are made with reference to the accompanying drawings, unless otherwise indicated, the same numbers in different accompanying drawings represent the same or similar elements. The following implementations described in the following exemplary embodiments do not represent all implementations that are consistent with the present disclosure. Instead, they are merely examples of apparatuses and methods consistent with aspects related to the present disclosure as recited in the appended claims.

The block diagrams shown in the accompanying drawings is merely a function entity and does not necessarily correspond to a physically independent entity. To be specific, such function entities may be implemented in the form of software, or implemented in one or more hardware modules or integrated circuits, or implemented in different networks and/or processor apparatuses and/or microcontroller apparatuses.

The flowcharts shown in the accompanying drawings are merely examples for descriptions, do not necessarily include all content and operations/steps, and are not necessarily performed in the described orders. For example, some operations/steps may be further divided, while some operations/steps may be combined or partially combined. Therefore, an actual execution order may vary depending on an actual situation.

"Multiple" mentioned in the present disclosure means two or more. The "and/or" describes an association relationship for describing associated objects and represents that three relationships may exist. For example, A and/or B may represent the following three scenarios: only A exists, both A and B exist, and only B exists. The character "/" generally indicates an "or" relationship between the associated objects.

FIG. 1 is a schematic diagram of a 5G (fifth generation mobile communication technology) network architecture according to an exemplary embodiment of the present disclosure.

As shown in FIG. 1, a 5G mobile communication network includes function entities such as a user equipment (UE), a (radio) access network ((R)AN), a user plane function (UPF), an access and mobility management function (AMF), a session management function (SMF), an application function (AF), and a policy control function (PCF). The AMF, the SMF and the UPF are network functions of a 5G core network, where the AMF is responsible for UE access and mobility management, the SMF is responsible for the management of user plane sessions, and the UPF is responsible for data packet routing and forwarding between a (R)AN and a data network (DN).

The technical solutions according to the embodiments of the present disclosure are proposed based on the 5G network architecture shown in FIG. 1. In certain embodiment(s), a switching control implementation procedure of the service server is proposed. In this implementation procedure, switching of the service server is implemented through the interaction between the 5G core network and the service scheduling server. In certain embodiment(s), the 5G core network initiates a notification message indicating that a user plane path of the UE may be changed. Responding to the notification message, the service scheduling server, on one hand, reschedules a service server for the UE and transmits an IP address of the rescheduled service server to the UE, and on the other hand, initiates a confirmation message for triggering the 5G core network to change the user plane path of the UE. Because the UE can obtain the IP address of the rescheduled service server, and the user plane path of the UE is accordingly changed in the 5G core network, the service access by the UE continues when the service server is switched, and the user cannot perceive the service interruption, thereby guaranteeing service continuity when the service server is switched.

In various embodiments of the present disclosure, the service server accessed by the UE before the service server is switched may be a service server deployed in a network closer to the UE, such as an edge service server described in the following embodiments.

The 5G network architecture supports the expansion and addition of network functions when the service server is switched. Thus, the solution may be further extended to newly added network functions that implement similar functions, without limiting the specific execution entity of the newly added functions of this solution.

Figure 2:
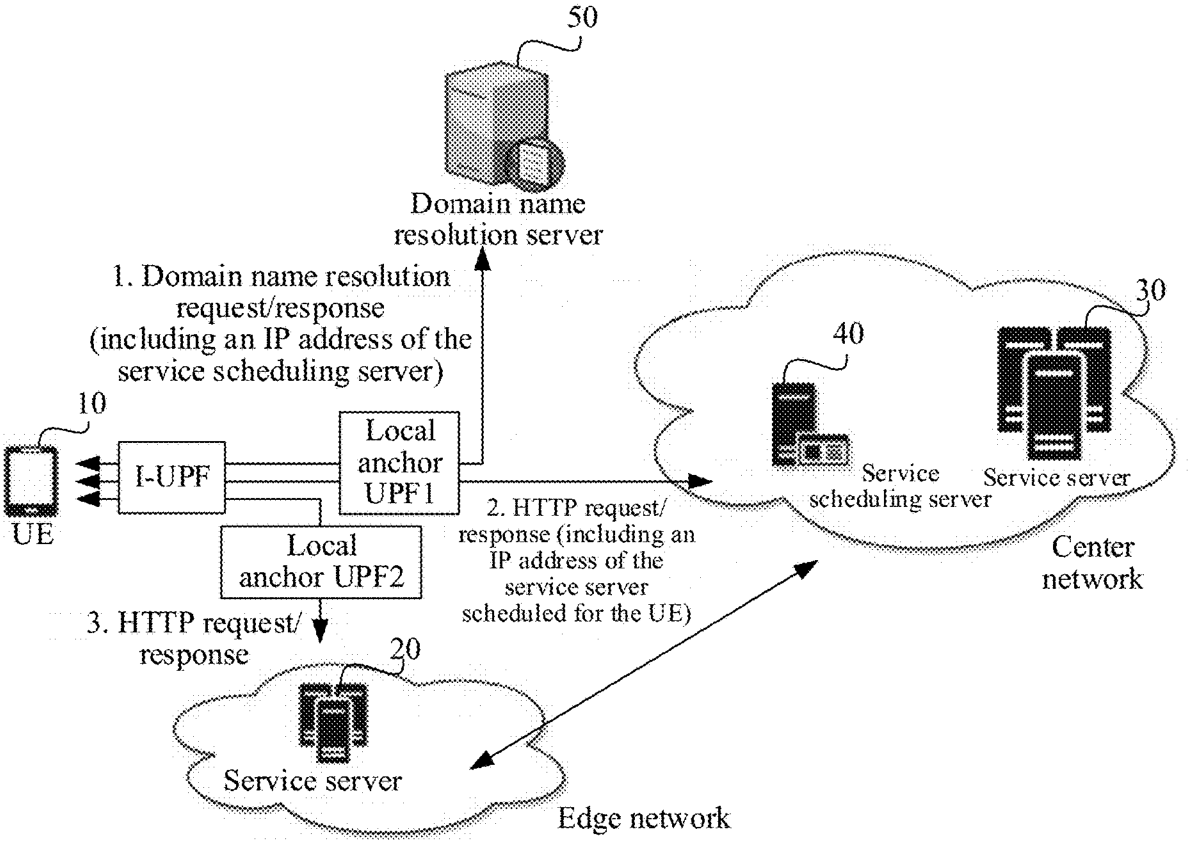
FIG. 2 is a schematic diagram of an implementation environment based on the network architecture shown in FIG. 1.

FIG. 2 is a schematic diagram of an implementation environment according to the present disclosure. The implementation environment is a service scheduling system proposed based on the 5G network architecture shown in FIG. 1, including a UE 10, a service server 20 deployed in an edge network, a service server 30 and a service scheduling server 40 deployed in a center network, and a domain name resolution server 50.

The edge network and the center network refer to the network location deployed by the service server, where the edge network is closer to the user side, to reduce a delay of the user accessing the service server; and the center network corresponds to the edge network, is usually deployed in a data center of the cloud, and is far from the user access location. The service server 20 deployed in an edge network may be referred to as an edge service server, and there are usually multiple service servers 20. Correspondingly, the service server 30 deployed in a center network may be referred to as a center service server. Usually, the service scheduling server 40 is deployed in a center network.

Under this network architecture, the UPF may be deployed in a form of supporting packet routing and forwarding, such as an intermediate UPF (I-UPF) and multiple local anchors UPF1 and UPF2 deployed in FIG. 2. The I-UPF may act as an uplink classifier to implement offloading of a data flow, and the local anchor UPF acts as a UPF that accesses the edge network.

A hypertext transfer protocol (HTTP) communication connection or a hyper text transfer protocol over secure socket layer (HTTPS) communication connection is established between the UE 10, and the service server 20 deployed in the edge network and the service scheduling server 40. For example, as shown in FIG. 2, the UE 10 obtains an IP address of the service scheduling server 40 returned by the domain name resolution server 50 by transmitting a domain name resolution request to the domain name resolution server 50, and initiates an HTTP request to the service scheduling server 40 according to the obtained IP address of the service scheduling server 40. In response to the HTTP request, the service scheduling server 40 schedules a corresponding service server for a service requested by the UE 10, and transmits an IP address of the scheduled service server to the UE 10 in a manner of HTTP response. According to the IP address of the service server received this time, the UE 10 makes HTTP requests and responses to the service server (shown in FIG. 2 is the edge service server 20), thereby implementing service access of the UE to the service server.

When the edge service server accessed by the UE 10 may be switched, the core network accessed by the UE 10 initiates a notification message to the service scheduling server 40 that the user plane path of the UE 10 is to be changed. Responding to the notification message, the service scheduling server 40, on one hand, reschedules a service server for the UE 10 and transmits an IP address of the rescheduled service server to the UE 10, and on the other hand, initiates a confirmation message for triggering the core network to change the user plane path of the UE 10. Because the UE 10 can obtain the IP address of the rescheduled service server, and the user plane path of the UE 10 is accordingly changed in the core network, when the service server is switched, the service access by the UE 10 synchronously switches the user plane path, thereby achieving service continuity. The user plane path of the UE 10 may be understood as the routing and forwarding path of service data between the UE and the local anchor UPF during service access of the UE 10.

The service server rescheduled for the UE 10 by the service scheduling server 40 may be other edge service servers deployed in the edge network, or may be a center service server deployed in the center network, which is not limited hereto.

The UE 10 in a system shown in FIG. 2 may be an electronic device such as a smartphone, a tablet computer, a notebook computer, a desktop computer, a smart speaker, a smartwatch, or an in-vehicle computer, which is not limited hereto. The service server 20 and/or the service server 30 may be an independent physical server, or may be a server cluster or a distributed system formed by a plurality of physical servers, where multiple servers may form a blockchain and the servers are nodes on the blockchain, or may be a cloud server that provides a cloud computing service such as a cloud service, a cloud database, cloud computing, a cloud function, cloud storage, a network service, cloud communication, a middleware service, a domain name service, a security service, a content delivery network (CDN), big data, and an artificial intelligence platform, which is not limited hereto.

Figure 3:
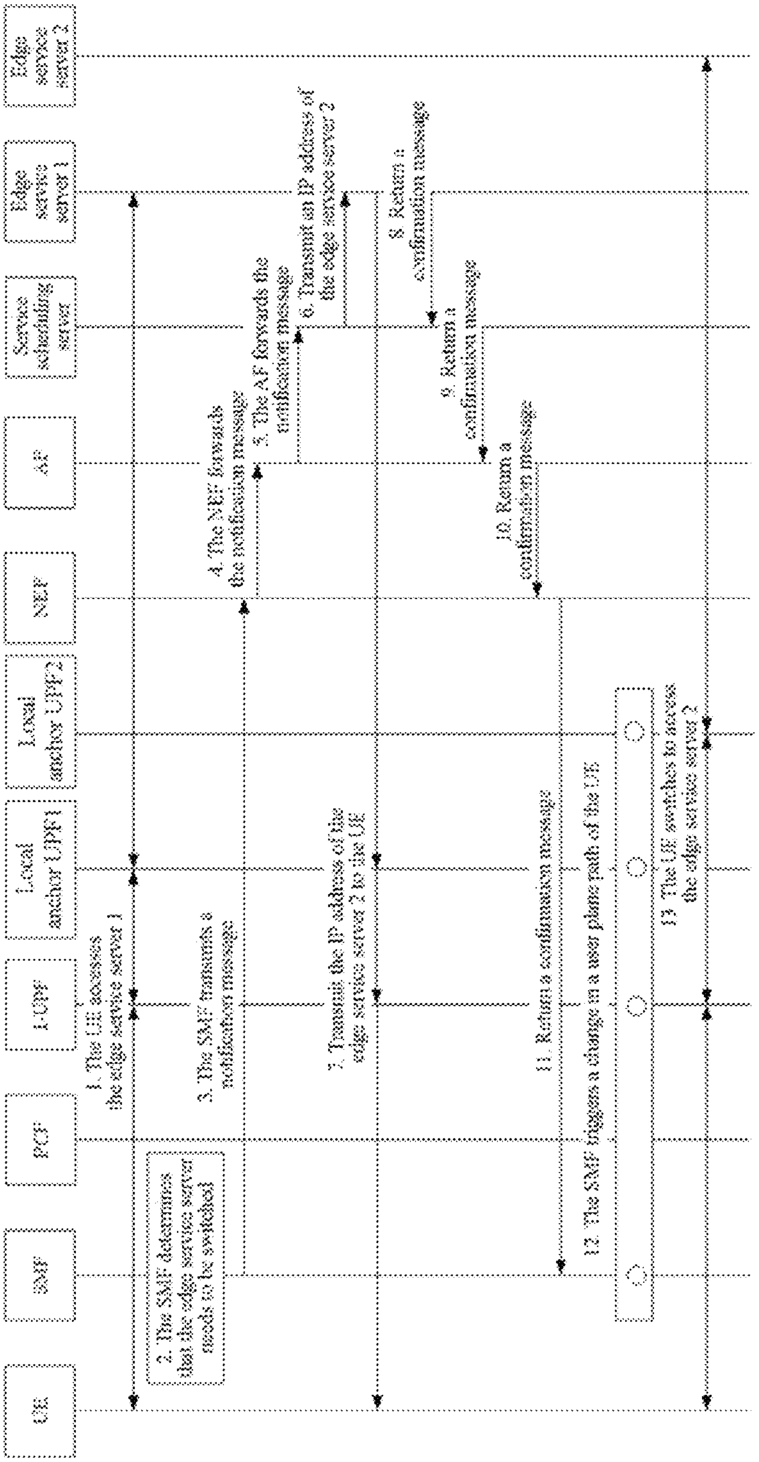
FIG. 3 is a schematic diagram of a service procedure according to certain embodiment(s) of the present disclosure.
Figure 4:
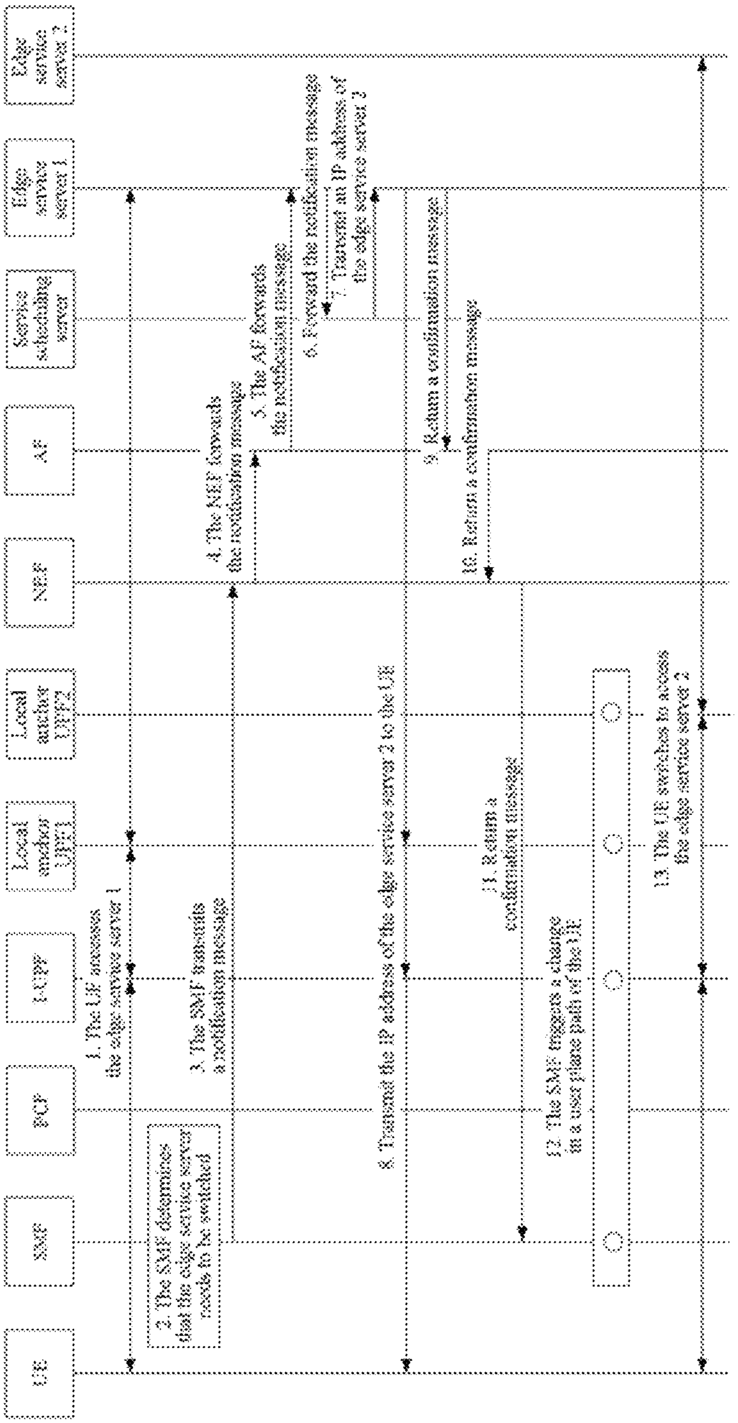
FIG. 4 is a schematic diagram of a service procedure according to certain embodiment(s) of the present disclosure.

FIG. 3 and FIG. 4 are schematic diagrams of service procedures for implementing service server switching under a 5G mobile communication network according to exemplary embodiments of the present disclosure. As shown in FIG. 3 and FIG. 4, in an exemplary service procedure, the UE implements service access to an edge service server 1 via the intermediate UPF (I-UPF) and the local anchor UPF1.

During the process of the UE accessing the edge service server 1, when the UE is moved, due to the change of the user access location, a situation may arise that the edge service server 1 is no longer the best access node for the UE, that is, at the updated access location of the UE, there is a more suitable edge network and edge service server. The SMF may determine whether the edge service server may be switched according to location information after the UE is moved and data network access identifier (DNAI) information (the information corresponds to deployment of the edge network). The determination by the SMF on whether the edge service server may be switched may be set according to an actual situation, which is not limited in this embodiment.

When the SMF determines that the edge service server currently accessed by the UE may be switched, the SMF transmits a notification message to the AF and transmits the notification message to the service scheduling server via the AF. The SMF may alternatively transmit the notification message to the AF via a network exposure function (NEF). The SMF may determine information of the AF according to subscription of the AF.

In some embodiments, the AF may transmit a notification message to the edge service server 1, to forward the notification message to the service scheduling server via the edge service server 1.

The notification message includes an indication of changing the user plane path of the UE, and an IP address of the UE, and may further include at least one of a DNAI and a duration desirable for the path change. The DNAI included in the notification message corresponds to a data network of the edge service server that the UE can access, and the duration desirable for the path change refers to a duration desirable for the 5G core network to perform the user plane path change of the UE.

After receiving the notification message, the service scheduling server selects a target DNAI from the DNAIs carried in the notification message, and uses an edge service server corresponding to the target DNAI as the edge service server after switching. When there are multiple edge service servers corresponding to the target DNAI, the service scheduling server may select one of the multiple edge service servers corresponding to the target DNAI.

Unless otherwise specified, an edge service server corresponding to a DNAI in the following description refers to one edge service server selected from multiple edge service servers corresponding to the DNAI.

When the notification message includes multiple DNAIs, the service scheduling server selects one of the DNAIs as the target DNAI; and when the notification message includes only one DNAI, the service scheduling server uses this DNAI as the target DNAI.

When or in response to a determination that the notification message does not include a DNAI, or when or in response to a determination that the notification message includes DNAIs but none of the edge service servers corresponding to these DNAIs is selected by the service scheduling server, the service scheduling server schedules a center service server deployed in the center network to provide service services to the UE.

In the service procedure implementation shown in FIG. 3, the target DNAI corresponds to an edge service server 2, the service scheduling server transmits an IP address of the edge service server 2 with a timer to the edge service server 1, a duration specified by the timer being greater than or equal to the duration desirable for the path change included in the notification message.

The edge service server 1 transmits the IP address of the edge service server 2 and the timer to the UE, for example, the edge service server 1 may transmit the IP address of the edge service server 2 and the timer to the UE in a manner of HTTP redirection, and return a confirmation message to the service scheduling server. The timer indicates that the UE initiates service access to the edge service server 2 after the timer expires. After receiving the confirmation message returned by the edge service server 1, the service scheduling server also transmits a confirmation message to the AF, and the AF transmits the confirmation message to the SMF via the NEF. The confirmation message transmitted to the AF includes the target DNAI, or the confirmation message transmitted to the AF includes the target DNAI and the IP address of the edge service server 2.

If the service scheduling server schedules the center service server to provide service services to the UE according to the notification message, the confirmation message transmitted by the service scheduling server to the AF does not include the DNAI information or the IP address of the center service server.

If the AF communicates with the service scheduling server through the edge service server 1, for example, as shown in FIG. 4, the edge service server 1 directly returns a confirmation message to the AF after transmitting the IP address of the edge service server 2 and the timer to the UE.

The SMF triggers a change in the user plane path of the UE according to the received confirmation message. As shown in FIG. 3, if the confirmation message includes the target DNAI, the target DNAI corresponds to the edge service server 2, and the data packet routing and forwarding of the data network corresponding to the target DNAI may be performed by the local anchor UPF2, the local anchor UPF1 is switched to the local anchor UPF2, and the IP address of the edge service server 2 is configured on the I-UPF as an offloading address.

In some embodiments, during the process of changing the user plane path of the UE, the I-UPF may be switched at the same time. If the I-UPF is switched at the same time, the IP address of the edge service server 2 is configured on a new I-UPF as an offloading address. Whether the I-UPF may be switched at the same time may be determined according to an actual situation, such as the updated location information of the UE and network deployment.

For example, in the service procedure implementation shown in FIG. 3 and FIG. 4, the user plane path of the UE 10 is the UE→the I-UPF→the local anchor UPF1 before the edge service server 1 is switched, and the user plane path of the UE 10 is changed to the UE→the I-UPF→the local anchor UPF2 after the edge service server 1 is switched.

It is to be understood that on this user plane path, the I-UPF may be the same or different; and this user plane path includes a node in the access network, such as a base station. A change in the user plane path of the core network may be caused only when a change in the UE location causes a change in the node in the access network. However, because switching of the node (such as base station) in the access network does not affect the implementation of this solution, and this solution considers switching of the user plane path of the core network, the description of the switching of the node in the access network is omitted in this solution.

In other embodiments, the confirmation message transmitted by the service scheduling server to the AF does not include the DNAI information, that is, the confirmation message indicates that the network is not desirable to establish an offloading path for the UE, the SMF does not need to establish an offloading path or deliver an offloading address when changing the user plane path of the UE (not shown in FIG. 3 and FIG. 4).

Through the execution of the above service procedures, because the UE has learned the IP address of the edge service server 2 or the center service server that the UE may switch to access, and the user plane path of the UE is also accordingly changed in the core network for the switching of the edge service server or the center service server, the UE can switch to access the edge service server 2 or the center service server, the service executed in the UE continues to be executed, and service access perceived by the user is not interrupted, thereby achieving service continuity when the service server is switched.

Furthermore, the UE initiates service access to the edge service server 2 or the center service server after the timer expires. Because the duration specified by the timer is greater than or equal to the duration desirable for the path change, it can be ensured that when the UE switches to the edge service server 2 or the center service server to initiate service access, the user plane path of the UE has been changed in the core network, to further ensure service continuity.

Figure 5:
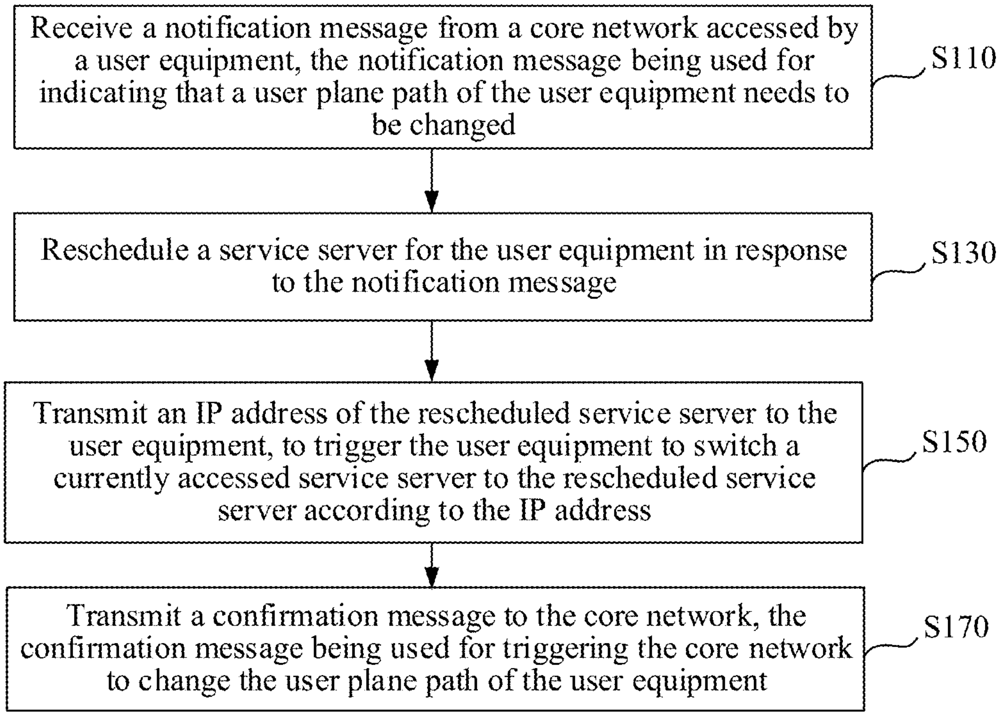
FIG. 5 is a schematic flowchart of a service server switching control method according to certain embodiment(s) of the present disclosure.

FIG. 5 is a flowchart of a service server switching control method according to an exemplary embodiment of the present disclosure. The method may be applied to the implementation environment shown in FIG. 2, and performed by the service scheduling server 40 in the implementation environment shown in FIG. 2.

In other implementation environments, for example, in a service scheduling system proposed based on another type of network architecture, the method may be performed by an electronic device that playing a service scheduling role in the service scheduling system, which is not limited in this embodiment. The another type of network architecture may be an architecture after the expansion and addition of network functions performed on the 5G network architecture shown in FIG. 1, that is, the method may be further extended to newly added network functions that implement similar functions, which is not limited in this embodiment either.

In this embodiment, an example in which the method is applicable to a service scheduling server is used to describe details of the method. The service server mentioned in the method is a server that provides service services for the UE. For example, the service server mentioned in the method may be an edge service server or a center service server shown in the implementation environment shown in FIG. 2, or may be another form of service server, which is not limited in this embodiment either.

The method according to this embodiment is applicable when the service server accessed by the UE before the service server is switched is a service server deployed in a network close to the UE, for example, an edge service server deployed in an edge network.

As shown in FIG. 5, the method may include step S110 to step S170. A detailed description is made as follows.

Step S110: Receive a notification message from a core network accessed by a user equipment, the notification message being used for indicating that a user plane path of the user equipment may be changed.

In this embodiment, the core network accessed by the UE can determine whether it is desirable to switch the service server accessed by the UE. For example, the SMF in the core network can determine whether to switch the service server according to location information after the user moves or DNAI information, the DNAI information corresponding to deployment of the edge network. If it is determined that the service server may be switched, the core network transmits a notification message to the AF, for example, the notification message is transmitted to the AF by the SMF via the NEF, to forward this notification message to the service scheduling server via the AF. The AF may directly transmit the notification message to the service scheduling server, or may transmit the notification message to the service server currently accessed by the UE, to forward the notification message to the service scheduling server via the service server currently accessed by the UE. The SMF may obtain information of the AF according to subscription of the AF.

The notification message includes an indication of changing the user plane path of the UE, and thus the notification message can be used to indicate that the user plane path of the UE may be changed. The notification message may further include the IP address of the UE. The notification message may further include a DNAI. The DNAI included in the notification message refers to a DNAI corresponding to the service server that the UE may switch to, the number of which is one or more.

Step S130: Reschedule a service server for the user equipment in response to the notification message.

After receiving the notification message transmitted by the AF, if the notification message includes DNAIs, the service scheduling server selects one DNAI as the target DNAI from the DNAIs included in the notification message, and uses the target DNAI as a DNAI corresponding to a target service server that the user equipment may switch to. When there are multiple service servers corresponding to the target DNAI, the service scheduling server may select one of the multiple service servers corresponding to the DNAI as the target service server that the user equipment may switch to.

When the notification message includes only one DNAI, the service scheduling server uses this DNAI as the target DNAI.

According to the selected target DNAI, the service scheduling server may obtain an IP address of the target service server corresponding to the target DNAI. For example, the service scheduling server may configure a correspondence relationship between the target DNAI and the IP address of the service server in advance, and according to the correspondence relationship, the service scheduling server may obtain the IP address of the target service server, which is not limited hereto.

In other embodiments, when or in response to a determination that the notification message does not include a DNAI, or when or in response to a determination that the notification message includes DNAIs but none of the edge service servers corresponding to these DNAIs is selected by the service scheduling server, the service scheduling server may schedule a center service server deployed in the center network to provide service services to the UE. The center service server is a service server corresponding to an edge network server deployed in an edge network. Reference may be made to the description in the embodiments.

Step S150: Transmit an IP address of the rescheduled service server to the user equipment, to trigger the user equipment to switch a currently accessed service server to the rescheduled service server according to the IP address.

In this embodiment, the IP address of the rescheduled service server may be transmitted to the UE, so that the UE switches to the rescheduled service server for access according to the received IP address, thereby implementing switching of the service server.

The service scheduling server may transmit the IP address of the rescheduled service server to the service server currently accessed by the UE, to forward the IP address of the rescheduled service server to the UE via the service server currently accessed by the UE. After forwarding the IP address of the rescheduled service server to the UE, the service server currently accessed by the UE may return a corresponding confirmation message to the service scheduling server or directly transmit the confirmation message to the AF.

If a communication connection is established between the UE and the service scheduling server, the service scheduling server may directly transmit the IP address of the rescheduled service server to the UE, which may be selected according to an actual situation and is not limited in this embodiment.

Step S170: Transmit a confirmation message to the core network, the confirmation message being used for triggering the core network to change the user plane path of the user equipment.

As described above, the rescheduled service server may be a service server corresponding to the target DNAI or may be a center service server. If the service server corresponding to the target DNAI is used as the rescheduled service server, the confirmation message includes the target DNAI, or includes the target DNAI and the IP address of the service server corresponding to the target DNAI. If the center service server is used as the rescheduled service server, the change notification message does not include the DNAI information or the IP address of the center service server.

The service scheduling server transmits the confirmation message to the AF, to forward the confirmation message to the core network, for example, to the SMF in the core network, via the AF. In some embodiments, the AF may alternatively transmit the confirmation message to the SMF via the NEF.

After receiving the confirmation message, the core network executes the change of the user plane path of the UE, for example, switches the UPF. The UPF after switching may be a UPF corresponding to the target DNAI, or a UPF corresponding to the center service server.

Because the UE has learned the IP address of the target service server that the UE may switch to access, and the user plane path of the UE is also accordingly changed in the core network for the switching of the service server, the UE can successfully switch to a new service server for access, the service access carried out in the UE continues to be executed, and the service perceived by the user is not interrupted, thereby achieving service continuity when the service server is switched.

In another embodiment, the notification message further includes a duration desirable for a path change, the duration desirable for the path change referring to a duration desirable for the core network to perform the user plane path change of the UE. Before step S170, the service scheduling server may further generate a timer according to the duration desirable for the path change carried in the notification message, a duration specified by the timer being greater than or equal to the duration desirable for the path change. The service scheduling server further transmits the timer to the UE, for example, forwards the timer to the UE via the service server currently accessed by the UE, to trigger the UE to switch to the rescheduled service server for access after the timer expires through the timer.

Because the duration specified by the timer is greater than or equal to the duration desirable for the path change, when the UE initiates service access to the service server corresponding to the target DNAI after the timer expires, the user plane path of the UE has been changed in the core network, thereby ensuring that the UE can successfully access the rescheduled service server, to ensure service continuity.

Figure 6:
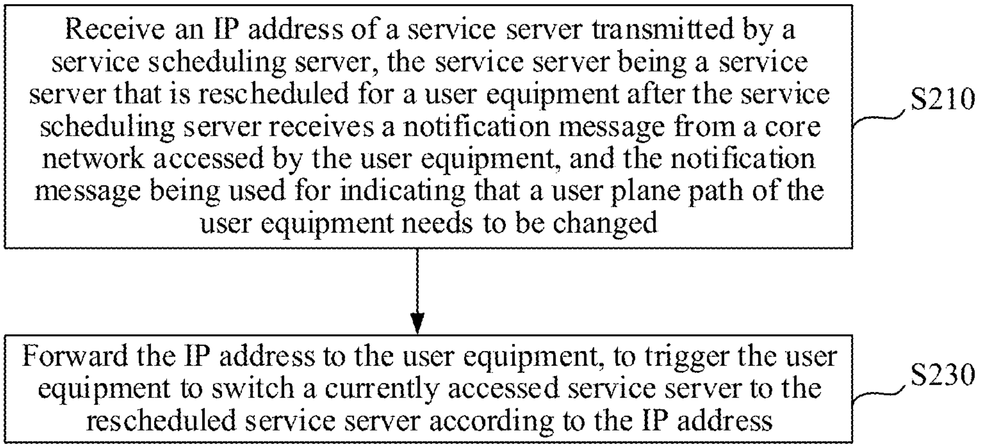
FIG. 6 is a schematic flowchart of a service server switching control method according to certain embodiment(s) of the present disclosure.

FIG. 6 is a flowchart of a service server switching control method according to another exemplary embodiment of the present disclosure. The method may be performed by a service server, the service server referring to a service server accessed by the UE before the service server is switched. The service server mentioned in the method proposed in this embodiment is also a service server that provides service data services for the UE. For example, the service server mentioned in the method may be an edge service server or a center service server shown in the implementation environment shown in FIG. 2, or may be another form of service server, which is not limited in this embodiment.

The service server accessed by the UE before the service server is switched refers to a service server deployed in a network close to the UE, for example, an edge service server deployed in an edge network.

As shown in FIG. 6, the method may include step S210 to step S230. A detailed description is made as follows.

Step S210: Receive an IP address of a service server transmitted by a service scheduling server, the service server being a service server that is rescheduled for a user equipment after the service scheduling server receives a notification message from a core network accessed by the user equipment, and the notification message being used for indicating that a user plane path of the user equipment may be changed.

As described in the embodiments, after receiving the notification message from the core network, the service scheduling server may reschedule the service server for the UE, and transmits the IP address of the rescheduled service server to the service server currently accessed by the UE. Thus, the service server currently accessed by the UE accordingly receives the IP address of the rescheduled service server transmitted by the service scheduling server.

Step S230: Forward the IP address to the user equipment, to trigger the user equipment to switch a currently accessed service server to the rescheduled service server according to the IP address.

The service server currently accessed by the UE may forward, to the UE, the IP address of the rescheduled service server transmitted by the service scheduling server, so that the UE switches the currently accessed service server to the rescheduled service server according to the IP address of the rescheduled service server, thereby implementing switching of the service server.

The service server may transmit the IP address of the rescheduled service server to the UE in a redirection manner. For example, a HTTP or HTTPS communication connection may be established between the UE and the service server, and the service server may transmit the IP address of the rescheduled service server to the UE in a manner of HTTP redirection.

The service server currently accessed by the UE may further return a confirmation message to the service scheduling server, to indicate that the IP address of the rescheduled service server has been forwarded to the UE. After receiving the confirmation message, the service scheduling server transmits a confirmation message to the core network, to trigger the core network to accordingly change the user plane path of the UE through the confirmation message.

It is to be understood that when the rescheduled service server is an edge service server deployed in an edge network, the confirmation message includes the DNAI information corresponding to the rescheduled edge service server, or includes the DNAI information and the IP address corresponding to the rescheduled edge service server. When the rescheduled service server is a center service server, the confirmation message does not include the DNAI information or the IP address of the center service server.

It can be learned that, when or in response to a determination that the UE has learned the IP address of the target service server that the UE may switch to access, and the user plane path of the UE is also accordingly changed in the core network for the switching of the service server, the UE can successfully switch to access the service server corresponding to the target DNAI, and the service executed in the UE is not interrupted, thereby achieving service continuity when the service server is switched.

In another embodiment, the service server currently accessed by the UE further receives a timer transmitted by the service scheduling server, the timer being generated by the service scheduling server according to a duration desirable for a path change carried in the notification message from the core network, and a duration specified by the timer being greater than or equal to the duration desirable for the path change.

The service server currently accessed by the UE further forwards the timer to the UE, to trigger the UE to switch to the rescheduled service server for access after the timer expires. Because the duration specified by the timer is greater than or equal to the duration desirable for the path change, when the UE initiates service access to the rescheduled service server after the timer expires, the user plane path of the UE has been changed in the core network, which ensures that the UE can successfully access the service server rescheduled by the service scheduling server, thereby further ensuring service continuity.

In another embodiment, before step S210, if the service server currently accessed by the UE further receives a notification message transmitted by the AF, the service server currently accessed by the UE further forwards the notification message to the service scheduling server. The service server currently accessed by the UE may further transmit a determination message to the AF after forwarding, to the UE, the IP address of the rescheduled service server transmitted by the service scheduling server.

Figure 7:
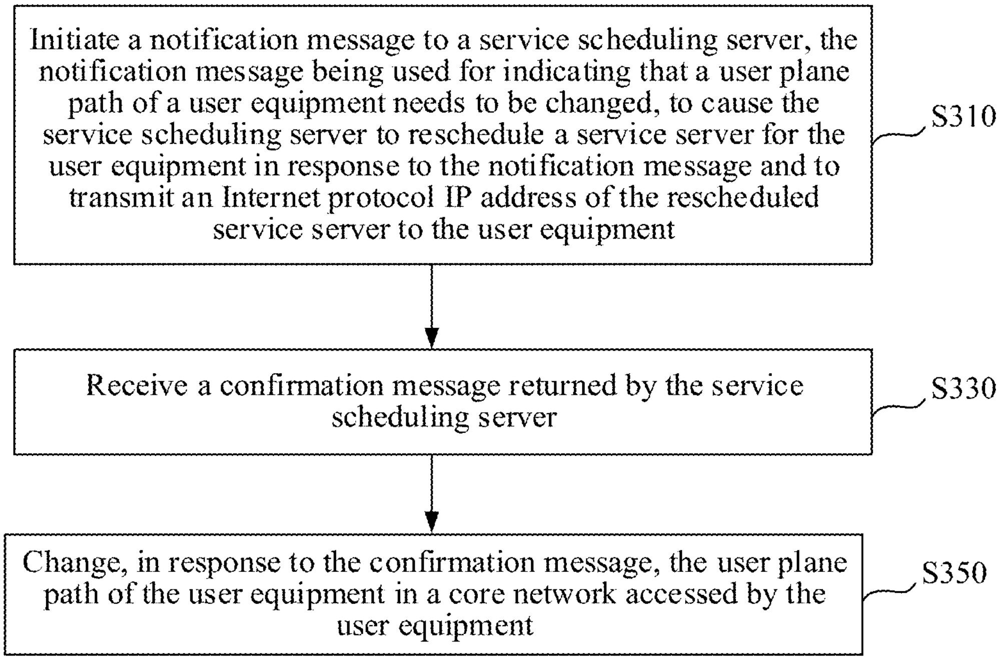
FIG. 7 is a schematic flowchart of a service server switching control method according to certain embodiment(s) of the present disclosure.

FIG. 7 is a flowchart of a service server switching control method according to another exemplary embodiment of the present disclosure. The method may be performed by the SMF in the 5G core network, or in some embodiments, the method may be performed by a function entity included in another type of mobile network having the same network function as the SMF, which is not limited in this embodiment.

The service server mentioned in this embodiment still refers to a service server that provides service data services for the UE. For example, the service server mentioned in this embodiment may be an edge service server or a center server shown in the implementation environment shown in FIG. 2, or may be another form of service server. The service server accessed by the UE before the service server is switched may be a service server deployed in a network close to the UE, for example, an edge service server deployed in an edge network.

In this embodiment, the method according to this embodiment is described using the SMF as an exemplary execution entity.

As shown in FIG. 7, the method may include step S310 to step S350. A detailed description is made as follows.

Step S310: Initiate a notification message to a service scheduling server, the notification message being used for indicating that a user plane path of a user equipment may be changed, to cause the service scheduling server to reschedule a service server for the user equipment in response to the notification message and transmit an Internet Protocol (IP) address of the rescheduled service server to the user equipment.

As described above, the SMF may monitor location information of the UE, and generate the notification message if it is determined according to the monitored location information that the service server accessed by the UE may be switched. For example, if the SMF determines that the UE is moved outside of the coverage of the data network of the currently accessed service server, it is decided that the service server accessed by the UE may be switched.

The SMF may further monitor deployment of the edge network according to the DNAI information corresponding to the edge network, to further determine whether the service server accessed by the UE may be switched after the UE is moved. For example, according to the DNAI information, the SMF may decide that there is a more suitable edge network and edge service server at the updated access location of the UE, thereby deciding that the service server accessed by the UE may be switched.

The notification message includes an indication of changing the user plane path of the UE, and thus the notification message can be used to indicate that the user plane path of the user equipment may be changed. The notification message further includes the IP address of the UE. The notification message may further include a DNAI, to identify a data network that the UE may access. The notification message may alternatively include a duration desirable for the path change, the duration desirable for the path change referring to a duration desirable for the SMF to trigger the change to perform the user plane path of the UE.

Because switching of the service server desires the service scheduling server to reschedule the service server for the UE, the SMF may transmit a notification message to the service scheduling server, to trigger the service scheduling server to reschedule the service server for the UE, for example, to trigger the service scheduling server to perform the relevant operations described in the embodiments. Details are not described herein again. For example, the SMF may transmit the notification message to the service scheduling server via the NEF and the AF.

Step S330: Receive a confirmation message returned by the service scheduling server.

The service scheduling server returns a confirmation message to the SMF after determining that the IP address of the rescheduled service server has been transmitted to the UE. As described above, the confirmation message may include the target DNAI selected by the service scheduling server from the DNAIs included in the notification message, or the confirmation message may include the target DNAI and the IP address of the service server corresponding to the target DNAI, or the confirmation message may not include the DNAI information.

Alternatively, after forwarding, to the UE, the IP address of the rescheduled service server transmitted by the service scheduling server, the service server currently accessed by the UE may transmit a determination message to the AF, to forward the confirmation message to the SMF via the AF.

Step S350: Change, in response to the confirmation message, the user plane path of the user equipment in a core network accessed by the user equipment.

After the SMF receives the confirmation message, a change of the user plane path of the UE is triggered to be executed, for example, the UPF is switched. The UPF after switching is a UPF corresponding to the access to the service server rescheduled by the service scheduling server.

For example, the UPF in the core network may be deployed in a form of supporting packet routing and forwarding, that is, an I-UPF and multiple local anchors UPF are deployed in the core network, and the user plane path change process of the UE relates to switching of the local anchor UPF. If the confirmation message includes the target DNAI, the IP address of the service server corresponding to the target DNAI may be further configured in the I-UPF, to use this IP address as an offloading address of the I-UPF after user plane path switching. In addition, during the process of changing the user plane path of the UE, the I-UPF may be switched at the same time. If the I-UPF is switched at the same time, the IP address of the service server corresponding to the target DNAI is configured on a new I-UPF as an offloading address.

If the confirmation message does not include the DNAI information, that is, the confirmation message indicates that the network is not desirable to establish an offloading path for the UE, the SMF does not need to establish an offloading path or deliver an offloading address when changing the user plane path of the UE. For example, if the service scheduling server schedules the center service server to provide service services to the UE, the SMF does not need to establish an offloading path during the user plane path change process.

In this embodiment, when the service server may be switched, because the UE has learned the IP address of the service server that the UE may switch to access, and the user plane path of the UE is also accordingly changed by the SMF for the switching of the service server, the UE can successfully switch to access the service server corresponding to the target DNAI, and the service access executed in the UE is not interrupted, thereby ensuring service continuity.

Figure 8:
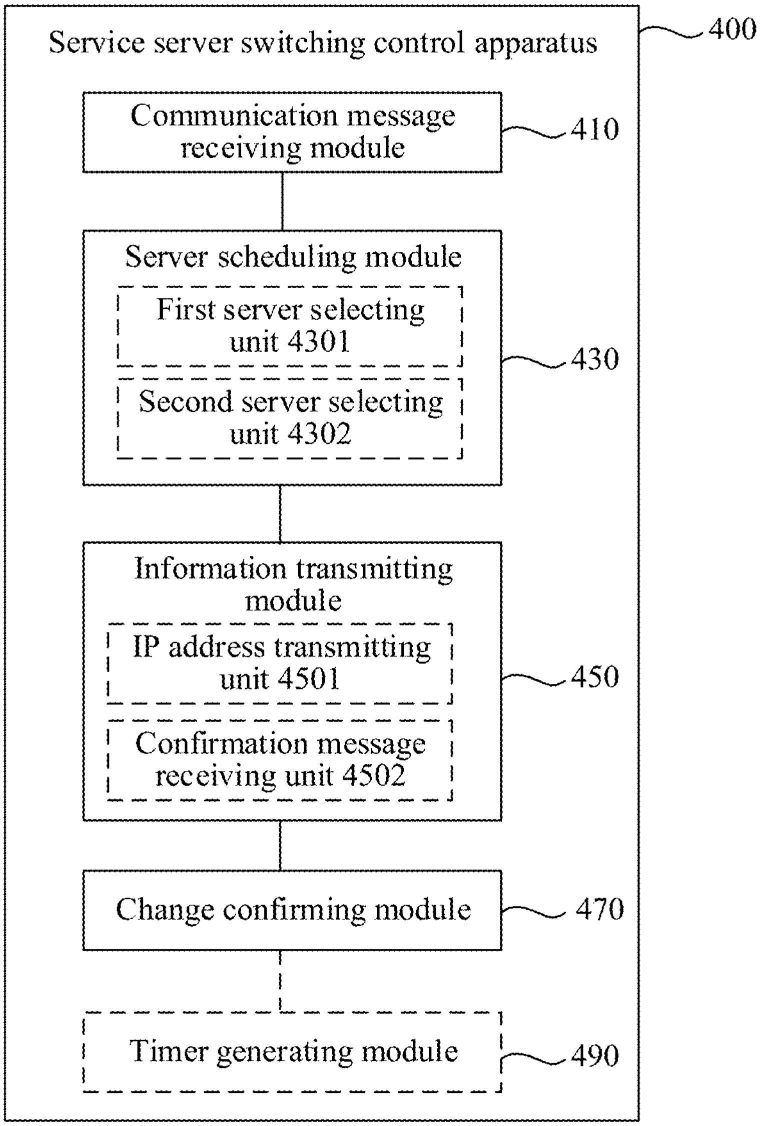
FIG. 8 is a schematic block diagram of a service server switching control apparatus according to certain embodiment(s) of the present disclosure.

FIG. 8 is a block diagram of a service server switching control apparatus according to an exemplary embodiment of the present disclosure. As shown in FIG. 8, the apparatus 400 includes: a communication message receiving module 410, configured to receive a notification message from a core network accessed by a user equipment, the notification message being used for indicating that a user plane path of the user equipment may be changed; a server scheduling module 430, configured to reschedule a service server for the user equipment in response to the notification message; an information transmitting module 450, configured to transmit an Internet Protocol (IP) address of the rescheduled service server to the user equipment, to trigger the user equipment to switch a currently accessed service server to the rescheduled service server according to the IP address; and a change confirming module 470, configured to transmit a confirmation message to the core network, the confirmation message being used for triggering the core network to change the user plane path of the user equipment.

In another exemplary embodiment, the apparatus further includes: a timer generating module 490, configured to generate a timer according to a duration desirable for a path change carried in the notification message, a duration specified by the timer being greater than or equal to the duration desirable for the path change; and configured to transmit the timer to the user equipment, to trigger the user equipment to switch to the rescheduled service server for access after the timer expires.

In another exemplary embodiment, the server scheduling module 430 includes: a first server selecting unit 4301, configured to select a target data network access point identifier from data network access point identifiers carried in the notification message, and to select a service server corresponding to the target data network access point identifier as the rescheduled service server.

In another exemplary embodiment, the confirmation message includes the target data network access point identifier, or includes the target data network access point identifier and the IP address of the rescheduled service server.

In another exemplary embodiment, the server scheduling module 430 includes: a second server selecting unit 4302, configured to select a service server deployed in a center network as the rescheduled service server when or in response to a determination that it is determined that no data network access point identifier is carried in the notification message, a service server currently accessed by the user equipment being deployed in an edge network, and the center network corresponding to the edge network.

In another exemplary embodiment, the information transmitting module 450 includes: an IP address transmitting unit 4501, configured to transmit the IP address to a service server currently accessed by the user equipment; and a confirmation message receiving unit 4502, configured to receive a confirmation message returned by the service server currently accessed by the user equipment, the confirmation message being used for indicating that the service server currently accessed by the user equipment has forwarded the IP address to the user equipment.

Figure 9:
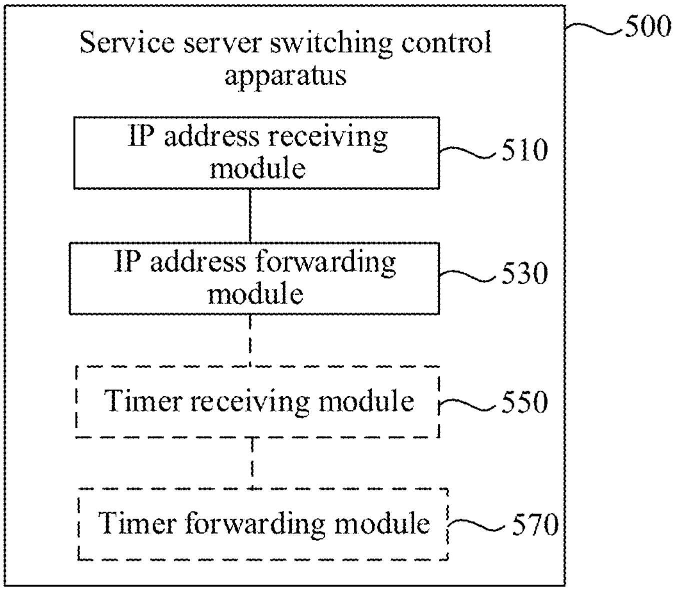
FIG. 9 is a schematic block diagram of a service server switching control apparatus according to certain embodiment(s) of the present disclosure.

FIG. 9 is a block diagram of a service server switching control apparatus according to another exemplary embodiment of the present disclosure. As shown in FIG. 9, the apparatus 500 includes: an IP address receiving module 510, configured to receive an Internet Protocol (IP) address of a service server transmitted by a service scheduling server, the service server being a service server that is rescheduled for a user equipment after the service scheduling server receives a notification message from a core network accessed by the user equipment, and the notification message being used for indicating that a user plane path of the user equipment may be changed; and an IP address forwarding module 530, configured to forward the IP address to the user equipment, to trigger the user equipment to switch a currently accessed service server to the rescheduled service server according to the IP address.

In another exemplary embodiment, the apparatus further includes: a timer receiving module 550, configured to receive a timer transmitted by the service scheduling server, the timer being generated by the service scheduling server according to a duration desirable for a path change carried in the notification message, and a duration specified by the timer being greater than or equal to the duration desirable for the path change; and a timer forwarding module 570, configured to forward the timer to the user equipment, to trigger the user equipment to switch to the rescheduled service server for access after the timer expires.

In another exemplary embodiment, the IP address forwarding module 530 is configured to forward the IP address to the user equipment in a redirection manner.

Figure 10:
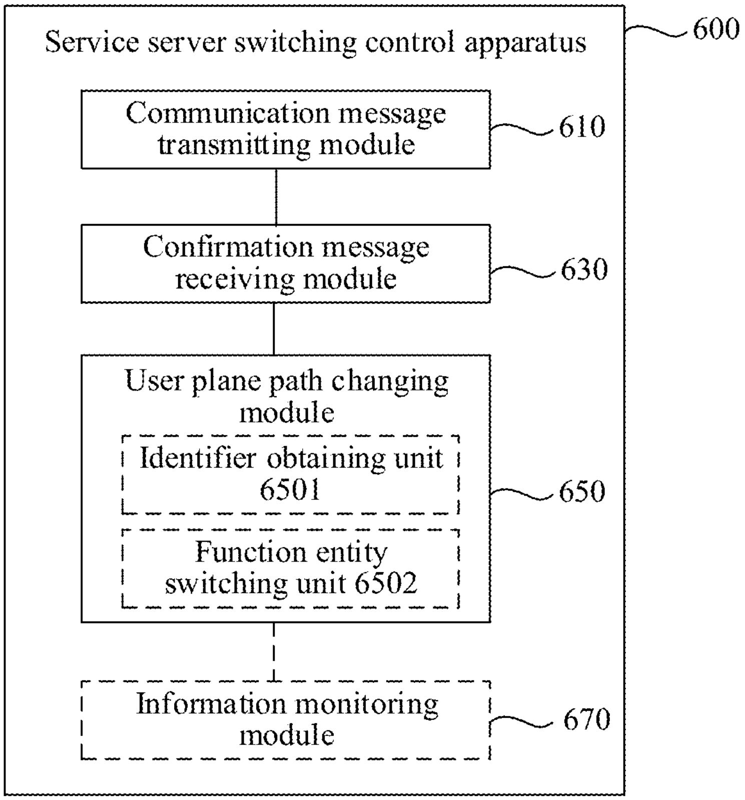
FIG. 10 is a schematic block diagram of a service server switching control apparatus according to certain embodiment(s) of the present disclosure.

FIG. 10 is a block diagram of a service server switching control apparatus according to another exemplary embodiment of the present disclosure. As shown in FIG. 10, the apparatus 600 includes: a notification message transmitting module 610, configured to initiate a notification message to a service scheduling server, the notification message being used for indicating that a user plane path of a user equipment may be changed, to cause the service scheduling server to reschedule a service server for the user equipment in response to the notification message and transmit an Internet Protocol (IP) address of the rescheduled service server to the user equipment; a confirmation message receiving module 630, configured to receive a confirmation message returned by the service scheduling server; and a user plane path changing module 650, configured to change, in response to the confirmation message, the user plane path of the user equipment in a core network accessed by the user equipment.

In another exemplary embodiment, the user plane path changing module 650 includes: an identifier obtaining unit 6501, configured to obtain a target data network access point identifier included in the confirmation message; and a function entity switching unit 6502, configured to switch, in the core network, a local anchor user plane function entity of the user equipment to a local anchor user plane function entity corresponding to the target data network access point identifier, and configure, in an intermediate user plane function entity, an IP address of a service server corresponding to the target data network access point identifier as an offloading address of the intermediate user plane function entity after user plane path switching.

In another exemplary embodiment, the apparatus further includes: an information monitoring module 670, configured to monitor location information of the user equipment, and generate the notification message when or in response to a determination that it is determined according to the monitored location information that the user plane path of the user equipment may be switched.

The apparatus provided in the embodiments and the method provided in the embodiments belong to the same idea. Specific operation manners of the modules and units have been described in detail in the method embodiments. Details are not described herein again.

In the embodiments of the present disclosure, an electronic device is further provided, including a processor and a memory, the memory storing computer-readable instructions, and the computer-readable instructions, when executed by the processor, implementing the service server switching control method described above.

Figure 11:
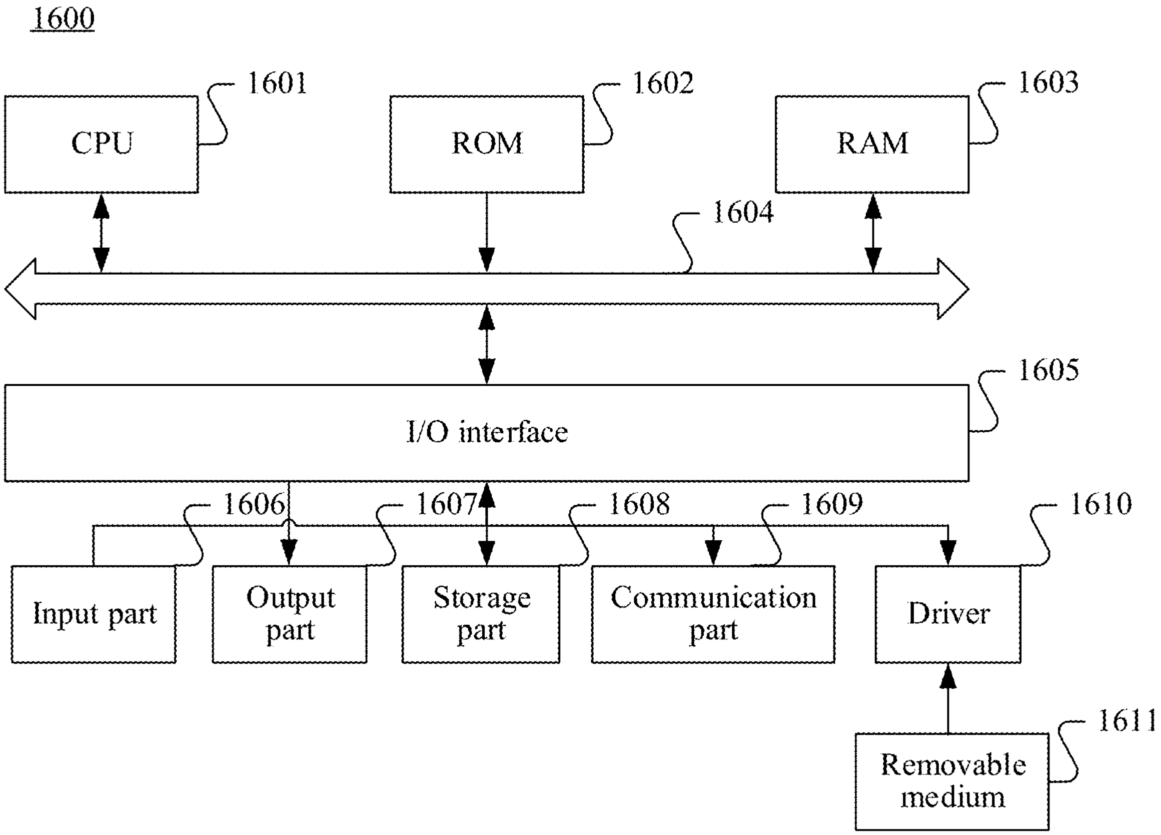
FIG. 11 is a schematic structural diagram of an electronic device according to certain embodiment(s) of the present disclosure.

FIG. 11 is a schematic structural diagram of an electronic device adapted to implement the embodiments of the present disclosure.

An electronic device 1600 shown in FIG. 11 is merely an example, and does not impose any limitation on the functions and use scope of the embodiments of the present disclosure.

As shown in FIG. 11, the electronic device 1600 includes a central processing unit (CPU) 1601, which may perform various suitable actions and processing based on a program stored in a read-only memory (ROM) 1602 or a program loaded from a storage part 1608 into a random access memory (RAM) 1603, for example, perform the method described in the embodiments. The RAM 1603 further stores various programs and data desirable for system operations. The CPU 1601, the ROM 1602, and the RAM 1603 are connected to each other through a bus 1604. An input/output (I/O) interface 1605 is also connected to the bus 1604.

The following components are connected to the I/O interface 1605: an input part 1606 including a keyboard, a mouse, or the like; an output part 1607 including a cathode ray tube (CRT), a liquid crystal display (LCD), a speaker, or the like; a storage part 1608 including hard disk or the like; and a communication part 1609 including a network interface card such as a local area network (LAN) card, a modem, or the like. The communication part 1609 performs communication processing by using a network such as the Internet. A driver 1610 is also connected to the I/O interface 1605 as desirable. A removable medium 1611, such as a magnetic disk, an optical disc, a magneto-optical disk, or a semiconductor memory, is installed on the drive 1610 as desirable, so that a computer program read from the removable medium is installed into the storage part 1608 as desirable.

Particularly, according to an embodiment of the present disclosure, the processes described in the by referring to the flowcharts may be implemented as computer software programs. For example, an embodiment of the present disclosure includes a computer program product. The computer program product includes a computer program stored in a computer-readable medium. The computer program includes a computer program used for performing a method shown in the flowchart. In such an embodiment, the computer program may be downloaded and installed from a network through the communication part 1609, and/or installed from the removable medium 1611. When the computer program is executed by the central processing unit (CPU) 1601, the various functions defined in the system of the present disclosure are executed.

The computer-readable medium shown in the embodiments of the present disclosure may be a computer-readable signal medium or a computer-readable storage medium or any combination thereof. The computer-readable storage medium may be, for example, an electric, magnetic, optical, electromagnetic, infrared, or semi-conductive system, apparatus, or device, or any combination thereof. More specific examples of the computer-readable storage medium may include, but are not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In the present disclosure, the computer-readable storage medium may be any tangible medium including or storing a program, and the program may be used by or in combination with an instruction execution system, apparatus, or device. In the present disclosure, the computer-readable signal medium may include a data signal transmitted in a baseband or as part of a carrier, and stores a computer-readable computer program. The propagated data signal may be in a plurality of forms, including, but not limited to, an electromagnetic signal, an optical signal, or any appropriate combination thereof. The computer-readable signal medium may be further any computer-readable medium in addition to a computer-readable storage medium. The computer-readable medium may transmit, propagate, or transfer a program that is used by or used in combination with an instruction execution system, an apparatus, or a device. The computer program included in the computer-readable medium may be transmitted by using any suitable medium, including but not limited to: a wireless medium, a wired medium, or any suitable combination thereof.

The flowcharts and block diagrams in the accompanying drawings illustrate possible system architectures, functions, and operations that may be implemented by a system, a method, and a computer program product according to various embodiments of the present disclosure. Each box in a flowchart or a block diagram may represent a module, a program segment, or a part of code. The module, the program segment, or the part of code includes one or more executable instructions used for implementing specified logic functions. In some implementations used as substitutes, functions marked in boxes may alternatively occur in a sequence different from that marked in an accompanying drawing. For example, two boxes shown in succession may actually be performed in parallel, and sometimes the two boxes may be performed in a reverse sequence. This is determined by a related function. Each block in the block diagram or the flowchart, and a combination of blocks in the block diagram or the flowchart may be implemented by using a dedicated hardware-based system that performs a specified function or operation, or may be implemented by using a combination of dedicated hardware and computer instructions.

Related units described in the embodiments of the present disclosure may be implemented in a software manner, or may be implemented in a hardware manner, and the unit described can also be set in a processor. Names of these units do not constitute a limitation on the units.

Another aspect of the present disclosure further provides a computer-readable storage medium, storing a computer program, the computer program, when executed by a processor, implementing the service server switching control method described above. The computer-readable storage medium may be comprised in the electronic device described in the embodiments, or may exist alone and is not configured in the electronic device.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Another aspect of the present disclosure further provides a computer program product or a computer program is provided, the computer program product or the computer program including computer instructions, the computer instructions being stored in a computer-readable storage medium. A processor of a computer equipment reads the computer instructions from the computer-readable storage medium, and executes the computer instructions, so that the computer equipment performs the service server switching control method provided in the embodiments.

What is claimed is:

1. A service server switching control method, performed by a service scheduling server, the method comprising: receiving a notification message from a core network accessed by a user equipment, the notification message being used for indicating that a user plane path of the user equipment is to be changed, the notification message being transmitted by a session management function (SMF) and forwarded via an application function (AF) to the service scheduling server, the SMF being deployed within the core network; rescheduling a service server for the user equipment in response to the notification message; transmitting an Internet Protocol (IP) address of a rescheduled service server to the user equipment, to trigger the user equipment to switch a currently accessed service server to the rescheduled service server according to the IP address; and transmitting, after the rescheduling the service server for the user equipment and after determining that the IP address of the rescheduled service server has been transmitted to the user equipment, a confirmation message to the core network, the confirmation message triggering the core network to change the user plane path of the user equipment after the user equipment is triggered to switch the currently accessed service server to the rescheduled service server according to the IP address, wherein in response to the confirmation message, the IP address of the rescheduled service server is configured as an offloading address in an intermediate user plane function (I-UPF); generating a timer according to a duration desirable for a path change carried in the notification message, a duration specified by the timer being greater than or equal to the duration desirable for the path change; and transmitting the timer to the user equipment, to trigger the user equipment to switch to the rescheduled service server for access after the timer expires.

2. The method according to claim 1, wherein rescheduling the service server comprises: selecting a target data network access point identifier from data network access point identifiers carried in the notification message.

3. The method according to claim 2, wherein rescheduling the service server comprises: selecting a service server corresponding to the target data network access point identifier as the rescheduled service server.

4. The method according to claim 2, wherein the confirmation message carries the target data network access point identifier, or carries the target data network access point identifier and the IP address of the rescheduled service server.

5. The method according to claim 1, wherein rescheduling the service server comprises: selecting a service server deployed in a center network as the rescheduled service server in response to a determination that no data network access point identifier is carried in the notification message, the service server currently accessed by the user equipment being deployed in an edge network, and the center network corresponding to the edge network.

6. The method according to claim 1, wherein transmitting the IP address comprises: transmitting the IP address to the service server currently accessed by the user equipment, to forward the IP address to the user equipment via the service server currently accessed by the user equipment.

7. A service server switching control apparatus, implemented at a service scheduling server, comprising: a memory storing computer program instructions; and a processor coupled to the memory and configured to execute the computer program instructions and perform: receiving a notification message from a core network accessed by a user equipment, the notification message being used for indicating that a user plane path of the user equipment is to be changed, the notification message being transmitted by a session management function (SMF) and forwarded via an application function (AF) to the service scheduling server, the SMF being deployed within the core network; rescheduling a service server for the user equipment in response to the notification message; transmitting an Internet Protocol (IP) address of a rescheduled service server to the user equipment, to trigger the user equipment to switch a currently accessed service server to the rescheduled service server according to the IP address; and transmitting, after the rescheduling the service server for the user equipment and after determining that the IP address of the rescheduled service server has been transmitted to the user equipment, a confirmation message to the core network, the confirmation message triggering the core network to change the user plane path of the user equipment after the user equipment is triggered to switch the currently accessed service server to the rescheduled service server according to the IP address, wherein in response to the confirmation message, the IP address of the rescheduled service server is configured as an offloading address in an intermediate user plane function (I-UPF); generating a timer according to a duration desirable for a path change carried in the notification message, a duration specified by the timer being greater than or equal to the duration desirable for the path change; and transmitting the timer to the user equipment, to trigger the user equipment to switch to the rescheduled service server for access after the timer expires.

8. The apparatus according to claim 7, wherein rescheduling the service server includes: selecting a target data network access point identifier from data network access point identifiers carried in the notification message.

9. The apparatus according to claim 8, wherein rescheduling the service server includes: selecting a service server corresponding to the target data network access point identifier as the rescheduled service server.

10. The apparatus according to claim 8, wherein the confirmation message carries the target data network access point identifier, or carries the target data network access point identifier and the IP address of the rescheduled service server.

11. The apparatus according to claim 7, wherein rescheduling the service server includes: selecting a service server deployed in a center network as the rescheduled service server in response to a determination that no data network access point identifier is carried in the notification message, the service server currently accessed by the user equipment being deployed in an edge network, and the center network corresponding to the edge network.

12. The apparatus according to claim 7, wherein transmitting the IP address includes: transmitting the IP address to the service server currently accessed by the user equipment, to forward the IP address to the user equipment via the service server currently accessed by the user equipment.

13. A non-transitory computer-readable storage medium storing computer program instructions executable by at least one processor to perform: receiving a notification message from a core network accessed by a user equipment, the notification message being used for indicating that a user plane path of the user equipment is to be changed; rescheduling a service server for the user equipment in response to the notification message, the notification message being transmitted by a session management function (SMF) and forwarded via an application function (AF) to a service scheduling server, the SMF being deployed within the core network; transmitting an Internet Protocol (IP) address of a rescheduled service server to the user equipment, to trigger the user equipment to switch a currently accessed service server to the rescheduled service server according to the IP address; and transmitting, after the rescheduling the service server for the user equipment and after determining that the IP address of the rescheduled service server has been transmitted to the user equipment, a confirmation message to the core network, the confirmation message triggering the core network to change the user plane path of the user equipment after the user equipment is triggered to switch the currently accessed service server to the rescheduled service server according to the IP address, wherein in response to the confirmation message, the IP address of the rescheduled service server is configured as an offloading address in an intermediate user plane function (I-UPF); generating a timer according to a duration desirable for a path change carried in the notification message, a duration specified by the timer being greater than or equal to the duration desirable for the path change; and transmitting the timer to the user equipment, to trigger the user equipment to switch to the rescheduled service server for access after the timer expires.

14. The non-transitory computer-readable storage medium according to claim 13, wherein rescheduling the service server includes: selecting a target data network access point identifier from data network access point identifiers carried in the notification message.

15. The non-transitory computer-readable storage medium according to claim 14, wherein rescheduling the service server includes: selecting a service server corresponding to the target data network access point identifier as the rescheduled service server.

16. The non-transitory computer-readable storage medium according to claim 14, wherein the confirmation message carries the target data network access point identifier, or carries the target data network access point identifier and the IP address of the rescheduled service server.

17. The non-transitory computer-readable storage medium according to claim 13, wherein rescheduling the service server includes: selecting a service server deployed in a center network as the rescheduled service server in response to a determination that no data network access point identifier is carried in the notification message, the service server currently accessed by the user equipment being deployed in an edge network, and the center network corresponding to the edge network.

* * * * *